United States Patent Office 2,956,963
Patented Oct. 18, 1960

2,956,963

SACCHARIDE-MONOHYDROXY ALDEHYDE REACTION PRODUCT AND METHOD OF PREPARING SAME

Ronald J. Baird, Philadelphia, Pa., assignor to The National Sugar Refining Company, New York, N.Y., a corporation of New Jersey No Drawing. Filed Aug. 2, 1954, Ser. No. 447,388

10 Claims. (Cl. 260—9)

This invention is that of generally clear, soft to glassy appearing resinous products having a high tolerance for water, and obtained by condensing aldol, in the presence of an acid condensation catalyst, with a saccharide such as a mono-saccharide as dextrose or a disaccharide as sucrose, or a glycoside as a lower-alkyl glucoside, or a cyclic acetal of a glycoside or of a mono- or di-saccharide, or with a mixture of any such saccharides or cyclic acetals of them.

The invention includes also the method of preparation of these resinous products. Broadly, the method embraces heating the aldol and the saccharide generally in the proportions of roughly about two moles of the former for each monosaccharide unit, in the presence of a sufficient quantity of an acid condensation catalyst adapted to promote the condensation of the aldol with the saccharide and otherwise inert to each of them under the reaction conditions; at a temperature between about room temperature and under that at which aldol decomposes by dehydration to an unsaturated compound; and usually for a time sufficient for the condensation of substantially all of the aldol with the saccharide; neutralizing the acid condensation when necessary to the use to be made of the product; and separating the resinous end product.

In general, the products can be prepared from any of the available forms of aldol, such as the commercial syrupy liquid, i.e. the ninety percent solution (aqueous), or the solid form as its dimer paraldol, or it can be freshly prepared by known method.

The saccharides applicable in the process of the invention and to produce the aldol condensation products include (a) a mono-saccharide sugar as dextrose (glucose, grape sugar, or starch sugar), mannose, levulose (fructose, honey sugar, or fruit sugar), galactose, xylose, and the like, (b) a disaccharide sugar as sucrose (cane sugar, beet sugar) or lactose (milk sugar), (c) a true glycoside such as the alpha and the beta lower-alkyl glucosides as alpha-methyl, -ethyl, -(normal)propyl glucosides, ethyl fructoside, or an aralkyl glucoside as alpha-benzyl glucoside, or an aryl glucoside as phenyl arabinoside; (d) a cyclic acetal of, for example, a lower alkyl aldehyde or ketone with any of these saccharides, such as mono-acetone (i.e. mono-propylidene) glucose, mono-ethylidene fructose, and the like, or mono-isopropylidene beta-ethyl mannoside, 4,6-benzylidene alpha-methyl glucoside, methylene benzyl galactoside, and others like them; so long as the glycoside or cyclic acetal of it or of the mono- or di-saccharide has at least two free hydroxyl groups and they are separated by not less than two nor more than three carbon atoms.

Since the above glycosides and cyclic acetals of the mono- or di-saccharides and glycosides generally may be formed by reaction of the corresponding mono- or di-saccharide or glycoside with all or only part of the required amount of the corresponding benzyl or lower aliphatic alcohol, aldehyde or ketone under reaction conditions similar to those whereby the products of the present invention are prepared, such glycosides and cyclic acetals may be replaced in the process of this invention by the corresponding mono- or di-saccharide or glycoside and the corresponding benzyl or lower aliphatic alcohol, aldehyde or ketone. The proportion of the respective reactants when making such substitution should be such that the resulting glycoside, or acetal of a mono- or di-saccharide or glycoside, should have at least two hydroxyl groups free to react with the aldol. In some cases the alcohol, aldehyde or ketone thus used as a reagent also can serve as a reaction medium or solvent, and then can be used in considerable excess, so long as the alcohol, aldehyde or ketone is otherwise unreactive and inert to the reactants and resulting product. The excess of it then is removed after completion of the reaction.

Alcohols which thus can be used to allow alkyl glucosides to form are the lower aliphatic monohydric alcohols with less than five carbon atoms, such as methyl, isopropyl, and butyl alcohols, the dihydric ether alcohols such as diethylene glycol, triethylene glycol, dipropylene glycol, and the aromatic alcohols such as benzyl alcohol. Ketones which can be used are acetone, methyl ethyl ketone, methyl butyl ketone and the cyclic ketones such as cyclohexanone and cyclopentanone. Aldehydes which may be used are the lower aliphatic aldehydes having up to about seven carbon atoms, for example, formaldehyde, acetaldehyde, butyraldehyde, heptaldehyde; and the aromatic aldehydes, such as benzaldehyde, salicylaldehyde, etc.

By "true" glycoside is meant such as is recognized in sugar chemistry to be derived through a hemi-acetal linkage between a sugar and an alcohol or a phenol as distinguished from such products which on hydrolysis do not give only sugars and an alcohol or a phenol.

In this specification and the appended claims, the expression "the saccharide" or "a saccharide" is used generically to refer to any, or one, of the saccharides enumerated in the parts (a) through (d) of the description of the applicable saccharides given above.

The acid condensation catalyst preferably can be inorganic such as a strong mineral acid as hydrochloric acid or sulfuric acid, or an acid sulfate as an alkali metal sulfate as sodium or potassium bisulfate or ammonium bisulfate or sulfamic acid. The sulfoacid catalyst, illustrated by sulfuric acid, an acid sulfate and sulfamic acid, includes also a strong organic sulfoacid such as an aromatic sulfoacid as the mononuclear benzene or toluene or phenol sulfonic acid, or a dinuclear sulfoacid as a naphthalene sulfonic acid, for example, a naphthalene disulfonic acid, or an aliphatic sulfoacid such as an alkylsulfonic acid.

The acid condensation catalyst is used in an amount sufficient for the desired condensation between the aldol and the saccharide to proceed. Thus, no lower limit can be given, for the amount of catalyst to use need only be sufficient to promote the taking place of the reaction. It can be as low as one quarter of a percent of the total weight of reactants, and under some circumstances possibly lower. The amount depends on the particular reactants used, the nature of the reaction medium, the temperature, the specific catalyst selected, and other operating conditions. In some cases, the amount of catalyst can be as high as about ten percent, more or less, of the total weight of reactants. The strong mineral acids are used preferably at the lower temperatures for they are more prone to induce decomposition of labile reactants at higher temperatures.

In some cases, the reaction can be conducted at ordinary atmospheric or room temperature. A practical upper limit of temperature is about 100° C.

A non-basic solvent inert to the reactants, catalyst and product under the reaction conditions can be used. It can be an inert organic solvent such as diethyl ether, di-isopropyl ether, tetrahydrofurane, dioxane, etc. Water can be used as a solvent, but as the reaction proceeds additional water is split off. Therefore, in such case it is advantageous to remove the water during the course of the reaction to bring it to completion. The water may be removed by distillation, preferably under reduced pressure, or by azeotropic distillation with the use of an entraining agent such as an inert organic liquid, or any other method relatively inert to the products.

The course of the reaction is not fully understood. While not to be bound by any specific explanation, one step is undoubtedly the formation of a cyclic acetal linkage between the carbonyl group of the hydroxy aldehyde and two of the hydroxyl groups of the sugar, glycoside or cyclic acetal of either of them. Each molecule of the hydroxy aldehyde requires for reaction two hydroxyl groups of the sugar, glycoside or cyclic acetal of any of them, but it is not necessary so to react all of the hydroxyl groups.

The hydroxyl group in the aldol starting material seems to contribute to the ease of reaction of the ingredients, and to the tolerance of the finished products for water and a wide range of solvents, and to the compatibility of the finished products with a wide range of natural and synthetic resins, proteins, etc., as shown by a consideration of their physical properties.

The new products of this invention are soft and resinous solids, which can be used as plasticizers, for example, of resins to be used in low humidity atmospheres, or in some cases admixed with other plasticizers. They can also be used as extenders for, i.e. used along with other substances, as proteins, such as soy proteins, animal glue, zein and casein, or as ingredients contributing improvements in various compositions such as printing inks and adhesives, and in other compositions or applications where a soft resin having water tolerance is beneficial. The product of Example 7, for example, is effective as an extender for zein in printing ink.

These products have the property of tolerating considerable amounts of water when it is present in non-aqueous systems in combination with solvents and other resins, while retaining homogeneity and without any phase separation. This property makes them particularly valuable in formulations where this behavior is desired.

The products of this invention can also be used as plasticizers for other resins, such as polyvinyl alcohol, polyvinyl acetate, methyl and ethyl cellulose, cellulose nitrate, cellulose acetate-butyrate, and others. When used as sizing agents for textile fibers, these products have been found to increase the abrasion resistance and tensile strength of cotton, and the abrasion resistance of synthetic fibres such as nylon, "Orlon," "Dynel" and "Dacron." They can also be used as anti-static agents for synthetic fibres such as "Dynel," "Orlon" and "Dacron"; and as plasticizers for paper.

In general, these products have good solubility in water and the lower aliphatic alcohols, particularly methanol and ethanol, and in glycols, glycol ethers, and cyclohexanol. Some have moderate solubility in aromatic hydrocarbons such as benzene and toluene, in esters such as ethyl acetate and isopropyl acetate and in ketones such as acetone and methyl ethyl ketone. They are quite insoluble in such chlorinated solvents as carbon tetrachloride, ethylene dichloride, and in aliphatic hydrocarbons.

The reaction materials may be filtered before and/or after the neutralization of the acid catalyst. That can serve to remove any unreacted sugar or glycoside or cyclic acetal of either of them, or any other insoluble materials formed in any part of the process.

The acid catalyst can be neutralized, after the condensation reaction is completed by any practical basic substance inert to the reaction products and any solvent or excess reactants present, such as an alkaline earth metal oxide (for example, in a slurry as milk of lime) or carbonate or an alkali cation carbonate such as alkali metal or ammonium bicarbonate, or alkali metal hydroxide, preferably in dry finely divided form.

The various properties of the products of the invention will depend on the starting materials used to prepare them; and some of the products, for example, have lower solubility in water and relatively more solubility in some organic solvents, as seen in the various following examples that serve to illustrate, but not to restrict, the invention:

*Example 1.—Aldol and methyl glucoside*

(a) *Preparation of aldol.*—In a reaction vessel equipped with thermometer, efficient stirrer and inserted cooling coil, was placed 330 milliliters (somewhat less than 6 moles) of commercial acetaldehyde. 170 milliliters of methanol were then run in slowly while stirring and cooling to maintain the temperature of the mixture below 20° C. A sodium methoxide solution, made by dissolving 0.75 gram of sodium in 55 milliliters of methanol, was then added gradually under the surface of the liquid, while stirring and maintaining the temperature between 20° and 25° C. The addition required an hour and one-half. The specific gravity of the reaction mixture was then 0.940. Stirring was continued for 9 hours while maintaining the temperature of 20° to 25° C. in the mixture. The specific gravity at the end of this time was 0.960.

(b) *Reaction of the aldol (and methanol) with dextrose.*—To the mixture of aldol (about 258 grams) and methanol was added 180 grams (1 mole) of powdered anhydrous dextrose and a solution of 8 milliliters (15 grams) of concentrated sulfuric acid in 40 milliliters of methanol. The mixture was stirred for 30 hours at a temperature of about 45° C. All of the dextrose reacted, forming a clear reaction solution. This was neutralized by stirring for 4 hours at 45° C. with 25 grams of dry, precipitated calcium carbonate. The mixture was then filtered, and the filtrate was vacuum steam distilled for three hours to remove excess methanol and aldol. There remained two hundred and fifty grams of syrupy product containing 84.75% solids. This was further concentrated to a final product as a glassy mass of 94.5% solids. This was soluble in water, methanol, ethanol, ethylene glycol; slightly soluble in butanol, ethyl acetate, acetone, benzene; and insoluble in carbon tetrachloride, and n-heptane. The product's hydroxyl content calculated on 100% solids was 19.5%. The theoretical hydroxyl content for the monocyclic acetal of aldol and methyl glucoside is 19.3%.

*Example 2.—Aldol and propylene glycol with dextrine*

Ninety grams of dextrine were heated with 76 grams of propylene glycol (1 mole) and 0.5 gram of phenol sulfonic acid for 2 hours while stirring in a flask heated by an oil bath held at 125–145° C. 90 grams more of dextrine were then added and the heating and stirring continued for 1½ hours. The mixture containing the resulting glycoside was allowed to cool to 80° C. 98 grams of 90% aldol solution (1 mole) then were added and the stirring was continued for 9½ hours with the oil bath held at about 80° C. A vacuum pump, pulling 30 inches of mercury, was used to distill off from the reaction mixture, during a half hour with the bath still at 80° C., water from the original aldol solution as well as that formed in the reaction, after which the final product was poured on a metal tray and allowed to cool to a clear, brittle solid.

Example 3.—Aldol and acetone with (propionaldehyde) and sugar

A mixture of 3,098 grams of 90% aldol solution (31.7 moles) and 375 grams of propionaldehyde (6.47 moles) was stirred in a flask cooled by running water. To this was added slowly a mixture of 2,250 milliliters of acetone (an excess) and 200 grams of concentrated sulfuric acid, previously prepared by adding the acid to the acetone slowly while cooling it in ice water. 3,879 grams of fine granulated sugar (11.3 moles) were added and stirring was continued at room temperature (25° to 30° C.) for 46 hours.

The resulting clear product was then neutralized by mixing with 130 grams of 95% calcium oxide made into milk of lime with 6 liters of water. The pH was adjusted to 7 with small additions of sulfuric acid. The neutralized reaction product was filtered, and the clear filtrate then concentrated to 3,408 grams of soft resin which was partly soluble in water, partly soluble in benzene and toluene, and completely soluble in methanol and ethanol.

Example 4.—Aldol and methyl isobutyl ketone with propionaldehyde and sugar

A mixture of 360 grams of anhydrous dextrose (2 moles), 196 grams of 90% aldol solution (2 moles) and 100 grams of methyl isobutyl ketone (1 mole) was stirred while 30 grams of aqueous 65% sulfuric acid were added slowly. The mixture was then heated in a water bath held at 50° C. for 2 hours, then for 3 hours longer while the water bath temperature was raised to 60° C. After cooling somewhat, 58 grams of propionaldehyde (1 mole) were added (to enhance the reactivity), and stirring was continued with the bath at 50–55° C. for 5 hours longer. The product was filtered, and the clear filtrate then was stirred with milk of lime made by slaking 11 grams of 95% calcium oxide with 300 milliliters of water. The pH was adjusted to 7 with small additions of sulfuric acid, and the mixture then was filtered. The filtrate was shaken up with benzene and allowed to settle into the respective benzene and aqueous layers. The two layers then were separated, and each was individually concentrated. The water layer yielded 249 grams of a resinous product, and the benzene layer yielded 170 grams also of a resinous product. Both were light-amber colored, clear, and had a mild odor.

Example 5.—Aldol with acetone and sucrose (a) *Preparation of aldol.*—Anhydrous aldol was prepared by adding gradually to a mixture of 700 grams of acetaldehyde and 175 grams of methanol, cooled to 15° C., a solution of 1.75 grams of sodium hydroxide dissolved in 40 milliliters of methanol. During the addition the reaction mixture was stirred vigorously and cooled to maintain the temperature at 20–22° C. Immediately after the addition of the sodium hydroxide the specific gravity of the mixture was 0.940; an hour and one-half later it was 0.960. The mixture was neutralized to a pH of 4.5 by adding 3.5 milliliters of 85% phosphoric acid. The unreacted acetaldehyde was distilled off by heating the reaction mixture in a water bath held at 60° C. The residue was filtered to remove the sodium phosphate before finishing the concentration. The weight of aldol obtained was 283 grams (3.22 moles).

(b) *Reaction aldol with sugar and acetone.*—To the aldol so obtained were added 499 grams of sugar and 380 grams of acetone (an excess) in which was dissolved 15 grams of hydrogen chloride. The reaction mixture was stirred during 5 hours at about 40° C. It then was neutralized by stirring at 40° C. with 80 grams of powdered sodium bicarbonate, diluted with 330 milliliters of anhydrous ethyl alcohol, cooled and filtered. The ethyl alcohol and excess acetone were removed from the filtrate by distillation, and the residue was finally concentrated under reduced pressure. The resulting soft resin weighed 700 grams. It was completely soluble in methanol, and triethylene glycol; partly soluble in toluene, methyl ethyl ketone, and isopropyl acetate.

Example 6.—Aldol and acetone and methanol with sugar (a) *Preparation of anhydrous aldol.*—27.72 liters (21.7 kilos) of acetaldehyde were placed in a fifteen gallon stainless steel vessel provided with a cooling coil and stirrer, and cooled to 15° C. With the stirrer going, 14.18 liters (11.23 kilos) of methanol were gradually run in with efficient cooling to maintain the temperature at 17–20° C. A solution of sodium methoxide, made by dissolving 63 grams of sodium in 4.73 liters (3.75 kilos) of methanol, was gradually added, while stirring and cooling to maintain the temperature of the reaction mixture at 20–25° C. The time required for the addition was 2 hours. The mixture then was allowed to stay at this temperature with only moderate stirring until the specific gravity rose to 0.947, which required 4½ hours.

(b) *Reaction of aldol with sugar and acetone.*—The resulting aldol solution was transferred to a thirty gallon jacketed and glass-lined autoclave together with 18.35 liters (14.53 kilos) of acetone (250.5 moles), a solution of 420 milliliters (773 grams) of sulfuric acid dissolved in 2.1 liters (1.66 kilos) of methanol, and 42.81 kilos of fine granulated sugar (125.2 moles). The mixture was stirred continuously and heated with hot water in the jacket to a temperature of 45–48° C. and held there during 5 hours. All of the sugar was then in solution. The acid catalyst was neutralized by stirring in (gradually, to prevent excessive foaming) 1.40 kilos of calcium carbonate, while still maintaining the reaction temperature. The mixture then was filtered through a pressure filter, and 4.98 liters (3.94 kilos) of methanol were used to wash the filter cake. The clear filtrate was concentrated to remove excess acetone and unreacted methanol and some of the aldol in it. The resulting distillate contained 1.67 kilos of aldol and 9.53 kilos of acetone.

The residual concentrated product was extracted while hot with 22.7 liters of toluene, which removed the remaining unreacted aldol along with a part of the product. The toluene (upper) layer was run off and concentrated by evaporating off the toluene under reduced pressure, leaving a residue which weighed 3.68 kilos. It was a clear resin soluble in most organic solvents but very little soluble in water. The toluene distillate contained 1.21 kilos of aldol with part of it as an aqueous layer.

The main portion of the product (left after running off the toluene layer) was diluted with a mixture of 12 liters of 99% isopropyl alcohol and 6 liters of methanol; and then reconcentrated. The thus concentrated product weighed 44.95 kilos. It was a clear, soft resin, soluble in water and in lower aliphatic alcohols, and partly soluble in other organic solvents. Its solids content, determined by drying at 70° C. in a vacuum oven, was 88.25%.

Of the aldol used, only 18.9 kilos (or 213.9 moles) were reacted, giving a ratio of 0.854 mole of aldol per mole of hexose. Only 5 kilos (or 86.2 moles) of the acetone was consumed, or a ratio of 0.344 mole of acetone per mole of hexose. It is assumed that one mole of methanol was reacted per mole of hexose.

Example 7.—Aldol with sugar and methanol (a) *Preparation of aldol.*—A mixture of 18.0 liters (14.958 kilos) of acetaldehyde and 9.2 liters of methanol was prepared by running the methanol slowly into the aldehyde in a stainless steel autoclave, while stirring continuously and cooling to 15° C. The temperature then was allowed to rise to 20° C. To the mixture then was added slowly a sodium methoxide solution prepared by dissolving 41 grams of sodium in 3.1 liters of methanol. The mixture was stirred vigorously during the addition and the temperature was maintained at 20–25° C. by cooling. The mixture then was stirred slowly at 20–25° until its specific gravity rose to 0.943 (4 to 6 hours). After this point the aldol solution begins to develop a slight yellow color if it is not acidified.

(b) *Reaction of aldol with sugar and methanol.*—To the 170 moles of aldol thus prepared, there was added 4.58 liters of methanol, 211 milliliters of concentrated sulfuric acid dissolved in 1.26 liters of methanol (together with the other making 144 moles) and 18.0 kilos (52.63 moles) of sugar while maintaining vigorous agitation in the closed autoclave and raising the temperature of the mixture to 45–48° C. After 5 hours all of the sugar was in solution. The acid then was neutralized by stirring at 45–48° C. with 910 grams of precipitated calcium carbonate until the mixture was neutral. This required several hours. The mixture then was filtered and concentrated at atmospheric pressure in a rapid, one pass tubular evaporator to remove the excess methanol, some of the water formed in the reaction, and excess aldol.

The partly concentrated finished product, weighing 29.4 kilos and having a solids content of 68.3%, can be purified by steam distillation or extraction with a solvent such as benzene, toluene or cyclohexane to remove the remaining aldol, or it can be hydrogenated to convert the residual unreacted aldol to 1,3-butanediol. It also can be dried by further concentration, with or without the addition of an entraining agent such as toluene, n-propanol or n-butanol to facilitate the removal of water.

The product of this example can be used as an extender for zein in a printing ink. For this use, propylene glycol can be added to it in the above partly concentrated state to the extent of about 10 to 20% based on solids. The resulting solution is then further concentrated in the rapid evaporator under reduced pressure. This removes the remaining water and most of the residual unreacted aldol, leaving a solution of the product in propylene glycol, which is easy to handle and mix with the other ingredients of the printing ink. Other glycols can be used in place of propylene glycol if desired, and the product may be subjected to a steam distillation or extraction for more complete removal of aldol prior to the addition of the selected glycol.

*Example 8.—Aldol with n-propanol and sugar*

(a) *Preparation of aldol.*—To a mixture of 700 grams (880 milliliters) of acetaldehyde and 476 milliliters of n-propanol was added slowly a solution of sodium n-propoxide prepared by dissolving 2 grams of sodium in 100 milliliters of n-propanol. During the addition, which lasted 2 hours, the mixture was stirred vigorously and cooled to maintain the temperature at 20–25° C. Immediately after the addition, the specific gravity of the mixture was 0.930. Slow stirring was continued for 5 hours, while maintaining the temperature at 20–25° C. The specific gravity then was 0.950. Seven milliliters of acetic acid were added to the mixture thereby adjusting the pH to 6.8. The mixture then was heated at 90° C. for 1½ hours to remove free acetaldehyde. The distillate condensed during this time amounted to 180 milliliters. On cooling the mixture, sodium acetate crystallized out and was filtered off.

(b) *Reaction of aldol with sugar and n-propanol.*—To the mixture containing 7.95 moles of aldol was added then a solution of 6 grams of hydrogen chloride dissolved in 300 milliliters (11.8 moles) of n-propanol and 1035 grams (3 moles) of sugar, while stirring vigorously and continuously under reflux condenser. The reaction mixture was heated to 60° C. by a hot water bath. Stirring at this temperature was continued for eight and three-quarter hours. On cooling the reaction mixture separated into two layers. The top layer contained most of the product. The bottom layer consisted of some unreacted sugar, water of reaction, and some of the product. The bottom layer was run off and washed with 200 milliliters of n-propanol, and the washings were combined with the top layer. The top layer combined with the washings was neutralized by heating to 60° C. and stirring with 14 grams of powdered sodium bicarbonate, and then filtered. After concentration of the filtrate, 789 grams of the product were obtained.

*Example 9.—Aldol with sugar and ethanol*

A solution of aldol in anhydrous ethanol was prepared as in Example 8 by replacing its normal propanol by absolute ethanol. The aldol remaining after distilling off the excess acetaldehyde was estimated to be 512 grams (or 5.8 moles). To this was added 821 grams (2.4 moles) of sugar and 200 milliliters of anhydrous ethyl alcohol containing 6 grams of hydrogen chloride. The reaction was completed after stirring for 3 hours at 60° C. In this case the reaction mixture was homogeneous. It was neutralized and filtered as in Example 8. The filtrate was steam-distilled under reduced pressure to remove excess unreacted aldol, and then concentrated to yield 1066 grams of final product.

*Example 10.—Aldol with dextrose*

A mixture of 704 grams of a 90% aqueous aldol solution (7.2 moles) and 396 grams of dextrose monohydrate (2 moles) was stirred together while 75 grams of a 66.7% solution of sulfuric acid in water were added during 30 minutes. The mixture was stirred at room temperature for about 24 hours and at about 50° C. for 6 hours longer.

The resulting clear liquid then was neutralized by the addition of a 20% milk of lime slurry made by slaking about 23 grams of calcium oxide with water. The pH of the neutralized mixture was adjusted to 7 by additions of lime or dilute sulfuric acid as required. The mixture then was diluted with 750 milliliters of methanol and filtered, and the filter cake washed with methanol. The combined filtrate and washings was concentrated to yield 738 grams of product, which on analysis was found to contain 14.7% hydroxyl, 29.5% free aldol, 34.0% combined aldol, and 40.7% combined dextrose. Thus, the molal ratio of combined aldol to dextrose was 1.71 to 1.

*Example 11.—Aldol with diacetone alcohol and propionaldehyde with glucose*

A mixture of 360 grams anhydrous glucose, 232 grams of diacetone alcohol, 196 grams of 90% aqueous aldol solution and 25 milliliters of concentrated sulfuric acid, diluted by adding it to 25 grams of ice, was stirred and heated to 50–55° C. for 4¼ hours, and then cooled. Fifty-eight grams of propionaldehyde then were added, and heating and stirring at 50–55° C. were continued for 2½ hours.

The acid catalyst was neutralized by stirring into the reaction material a lime slurry made by slaking 27.5 grams of calcium oxide with 575 milliliters of water. The neutral mixture was filtered. Four hundred milliliters of water and 500 milliliters of benzene were added and the mixture was shaken vigorously and then allowed to settle to separate into the benzene and aqueous layers. The layers were separated and separately concentrated to yield 158 grams of resinous product soluble in benzene and 248.5 grams of resinous product soluble in water.

*Purification and isolation of the resinous product.*—The aldol sugar derivatives of a saccharide prepared according to the various specific examples illustrating the process of this invention can be freed from excess unreacted aldol by steam distillation under reduced pressure, after the neutralization of the acid catalyst and filtration, if necessary, to remove any residues not dissolved in the reaction products. The aldol is volatile with steam and is thereby separated from the aldol-sugar derivative which is non-volatile in the steam distillation.

After the subsequent concentration that usually removes the bulk of the water, wherever the use to be made of the aldol-saccharide derivative requires it, or if desired, complete removal of water can be achieved by further drying, as with a drum dryer, or by displacing the residual water with a solvent which forms an azeotrope with water and which is a good solvent for the aldol-saccharide derivative, for example, anhydrous ethyl alcohol, n-propyl alcohol, or isopropyl alcohol. Sufficient solvent should be used so that after evaporating off the solvent-water azeotrope, some residual solvent is left in the product. Alternatively, the incompletely dried aldol-saccharide derivative, while still in an atomizable state, can be spray dried.

An alternative procedure for eliminating any excess unreacted aldol is, if desired, to convert it by reduction to 1,3-butanediol, preferably by hydrogenation in presence of a platinum or nickel catalyst. In this process, the aldol-saccharide derivative is not affected by the hydrogenation. In some applications that can be made of the aldol-saccharide derivatives of this invention, the 1,3-butanediol can be a beneficial ingredient so that it need not be removed, for example, in the plasticization of casein or polyvinyl alcohol.

For some applications to be made of the aldol-saccharide derivative of the invention, the excess unreacted aldol which may be present in the end product of some of the examples can be left to remain in the product. Alternatively, it may be combined with a reagent which forms a compound with it, such as sodium bisulfite, ammonia, sulfur dioxide, ammonium sulfite, hydrogen cyanide, ammonium cyanide, cyanamide, and urea. The resulting compound need not be separated, but is left in the aldol-saccharide derivative which in this form is suitable for applications where the free aldol would be objectionable, for example, in plasticizing animal glue where the aldol would tan the glue.

Most of the aldol-saccharide derivatives of the invention, as exemplified by the products of the various foregoing examples are readily soluble in water. The others manifest at least some water-solubility to a practicable extent. The concentration of any that is of lower solubility can be increased by use of a small amount of a mutual solvent such as a lower alkanol as methanol or ethanol.

The water-soluble aldol-saccharide derivative of example 6 has been found to be particularly effective as a sizing composition ingredient for treating "Orlon," "Dacron" and "Dynel" fibers as well as cotton fibers preliminary to weaving. It can be used for such treatment, for example, admixed in equal proportions with polyvinyl alcohol, thereby replacing the equivalent amount of the latter, as an ingredient in the aqueous sizing bath especially for treating "Orlon" and "Dacron" fibres before weaving. Depending on the operating conditions and the results sought, the ratio of the aldol-saccharide derivative to the polyvinyl alcohol can be varied from one to one to some other advantageous relationship.

At least some of the products of the invention are effective to prevent the migration of a plasticizer, for example, an aliphatic polyhydric alcohol such as glycerol or glycols, from a resin such as polyvinyl alcohol by replacing such migratory plasticizer at least in part. This modification of the invention is illustrated by, but not restricted to, the following example:

*Example 12*

Fifty parts of polyvinyl alcohol, fifteen parts of glycerol, and thirty-five parts of the water-soluble aldol-methylglucoside derivative of Example 1 (all parts being by weight) were dissolved together in twice their total weight of water. (This gave an aqueous solution of thirty-three and one-third percent together of the polyvinyl alcohol, glycerol, and that derivative of Example 1.) This aqueous solution was deposited in a thin film over glass plates at least three by six inches in dimensions, and even over much larger surfaces, and the water was allowed to evaporate.

The resulting films thus obtained were clear, pliable and strong. The glycerine did not migrate out of them. The films remained pliable and even at such low relative humidities as prevail in desiccators over such desiccants as concentrated sulfuric acid, anhydrous calcium chloride or sodium sulfate.

Films cast from similar solutions but with either somewhat more or even much lower content of glycerine still retain the foregoing described advantageous properties. However, when the glycerine is entirely omitted and the films thus cast contain equal parts of polyvinyl alcohol and the aldol-methylglucoside derivative, they still are pliable at ordinary atmospheric conditions, but not at conditions approaching zero percent relative humidity.

The aqueous solutions of this Example 12 can be used also in coating other surfaces to provide transparent, even permanent, protective thin film coatings or can be admixed with suitable fillers and/or pigments for non-transparent surface coatings.

While Example 10 illustrates the aldol-derived cyclic acetal of a mono-saccharide, the following two examples demonstrate the cyclic acetal derivative of aldol with a disaccharide:

*Example 13.—Aldol with sucrose*

Anhydrous acetaldol was prepared in methanol solution as, for example, in Example 5. Phosphoric acid (85%) was added till the aldol solution was adjusted to pH 4.9. The precipitated sodium phosphate was filtered off, and the solution was distilled under reduced pressure. After the methanol was distilled off, collection of the aldol was begun when the distillate temperature reached 68° C. at a pressure of thirteen millimeters of mercury.

A mixture of 35.2 grams (0.4 mole) of the aldol thus obtained, 34.2 grams (0.1 mole) of sugar and 0.4 milliliter of concentrated sulfuric acid diluted with one milliliter of anhydrous ethanol was stirred and heated in a water-bath, held at about 55° C., for five and one-quarter hours when all of the sugar had entered into the reaction liquid which then became a clear solution. The stirring and heating were discontinued and the homogeneous, clear solution then was allowed to cool. Then it was diluted with fifty milliliters of anhydrous ethanol and neutralized at room temperature by stirring with two grams of precipitated calcium carbonate for about two hours.

The mixture was filtered, and the filtrate concentrated under reduced pressure. The residue left was 58.6 grams of a glassy clear, tacky, resinous product completely soluble in lower aliphatic alcohols such as methanol, ethanol, and butanol and lower glycols as ethylene glycol. It is incompletely soluble in acetone, isopropyl acetate, and chloroform, less soluble in toluene, and almost completely insoluble in carbon tetrachloride and normal heptane. Its solution in water was cloudy due to an apparently minor fraction readily removable by filtration.

*Example 14.—Aldol with sucrose*

A mixture of 35.2 grams of the freshly distilled aldol of Example 13, 17.1 grams of sugar and 0.3 milliliter of concentrated sulfuric acid diluted with one milliliter of anhydrous ethanol was stirred and heated in a water-bath held at 55° C. After three hours all of the sugar had gone into the reaction liquid which then became a clear solution. The heating and stirring were continued for two hours longer, after which the homogeneous, clear solution was allowed to cool.

It then was diluted, neutralized (with one and one-half grams of calcium carbonate), filtered and concentrated, all as in example 13. The residue was 43.9 grams of a glassy clear resin like, and showing the same solubilities of, that of Example 13.

The foregoing examples illustrate cyclic acetals of saccharides, derived by condensing the mono-hydroxy aliphatic aldehyde, aldol, with a saccharide, and include a distinct group of such aldol-derived cyclic acetals that are significantly advantageous because of their effective water solubility. Other mono-hydroxy aliphatic aldehyde-derived cyclic acetals of these saccharides are illustrated by, but not limited to, the following examples:

*Example 15.—Propionaldol with sucrose*

(a) *Preparation of propionaldol.*—Eight hundred grams of redistilled propionaldehyde and two hundred and eighty grams of methanol were placed in a three-necked vessel provided with mechanical stirrer, reflux condenser and dropping funnel. Forty milliliters of a normal solution of sodium hydroxide in methanol were added dropwise during one and one-half hours while the reaction vessel was cooled in a cold water-bath to hold the reaction temperature between 20° and 25° C. The reaction was continued for two hours thereafter at the same temperature.

Sixty-five milliliters of glacial acetic acid were added to bring the pH of the reaction solution to 4.95. Methanol and unreacted propionaldehyde were distilled off under reduced pressure by heating the reaction solution in a bath held at 50–60° C. The residue of 603 grams assayed 105.6% propionaldol, with propionaldehyde present accounting for the excess over 100%.

(b) *Reaction of propionaldol with sucrose.*—A mixture of five hundred and fifty-nine grams of the crude propionaldol thus prepared (about 4.8 moles, allowing for the sodium acetate present), eight hundred and twenty grams (2.4 moles) of sucrose and twenty-five grams of phenolsulfonic acid was heated with stirring during twenty hours in a reaction vessel immersed in a bath held at 60° to 70° C. The mixture then was cooled and stirred with five hundred milliliters of ethanol (95%). It separated into two layers. After settling, the ethanol (upper) layer was decanted. The lower layer was extracted similarly twice more with four hundred and twenty, and two hundred and fifty, milliliters of ethanol.

The ethanol extracts were combined and neutralized by stirring at 60° C. with five and one-half grams of powdered anhydrous sodium carbonate. The clear solution was concentrated under reduced pressure. There remained eight hundred and forty-one grams of residue containing 85.6% of dry, resinous substance: insoluble in water, soluble in methanol and ethanol, and partly soluble in acetone. On acid hydrolysis followed by distillation, 37.7% of an aldehyde, calculated as propionaldol percent product, were found in the distillate.

The portion insoluble in the ethanol was found to contain a relatively small quantity of propionaldol. This ethanol insoluble portion was almost completely soluble in methanol, and probably contained whatever small amount of sucrose was unreacted.

The saccharide in any of the foregoing lower aliphatic monohydroxy aldehyde derived cyclic acetal preparation examples can be replaced by the equivalent amount of some other saccharide of the type herein described. So also the specific lower alkanol or lower alkyl aldehyde or ketone used in any of these examples to prepare in situ either a lower alkyl glucoside or a cyclic acetal of it or of a sugar, can be replaced by a correspondingly equivalent amount of any other lower alkanol or mononuclear aralkyl alcohol or lower alkyl aldehyde or ketone or mononuclear aromatic aldehyde or ketone.

In place of the aldol or propionaldol in any of the foregoing examples, there can be used the correspondingly equivalent amount of some other aliphatic, especially lower aliphatic, monohydroxy aldehyde or polymer of any such polymerizable aldehyde as the dimer of aldol, or a precursor of any that results from a compound that can break down to yield a hydroxyaldehyde, for example, 2,3-dihydropyran which on hydrolysis yields 5-hydroxypentanol, or an aldoxane such as 2,4-dimethyl-6-hydroxy metadioxane which yields aldol and acetaldehyde, or the corresponding substituted dioxane that yields aldol and crotonaldehyde. This precursor type is illustrated by, but not restricted to, the following example, and any such starting material is included also by the expression "lower aliphatic monohydroxy aldehyde" when apparently used generically in this specification and its appended claims:

*Example 16.—2,3-dihydropyran with sucrose*

One-half gram of phenolsulfonic acid dissolved in thirty-five milliliters of water was added to 33.6 grams of 2,3-dihydropyran (0.4 mole). The mixture was stirred vigorously for fifteen minutes while being cooled to hold its temperature at 30° to 35° C. Then 34.2 grams (0.1 mole) of sugar were added and the stirring was continued with the mixture held at that same temperature. Forty-five minutes later the mixture became homogeneous. After another forty-five minutes, the temperature was raised to 60° to 70° C. and stirring was continued at that temperature for fifteen minutes. Finally, the reaction mixture was stirred and heated on a steam-bath for an hour while the water was distilled off under reduced pressure of twenty-three inches of vacuum at the start, decreasing to about thirty inches when the operation ended. There remained a yield of 62.2 grams of a tacky, soft to brittle resin insoluble in water and completely soluble in methanol.

As seen in the various examples, and the earlier general description, the condensation catalyst is a strong acid-reacting substance capable of catalyzing the condensation of a carbonyl group with two hydroxyls to produce a cyclic acetal linkage. The higher the condensation reaction temperature, the lower can be the concentration of catalyst. The greater the dilution of the reaction mixture, the higher may be the catalyst concentration. The more readily reactive with one another may be the aliphatic monohydroxy aldehyde and the saccharide, the lower may be the necessary catalyst concentration. Where necessary, a small test batch can be run for an indication of the adequacy of the concentration of the selected catalyst under the operating conditions to be used. Those skilled in the art will be able to judge.

In the cyclic acetal products of the invention, resulting from the condensation of a saccharide with the lower aliphatic monohydroxy-aldehyde, the divalent grouping thus linked to the saccharide and appearing as the monohydroxy-aldehyde with the oxygen removed from its carbonyl group, can be referred to as the monohydroxy lower alkylidene group.

In any run according to the invention, wherein unreacted, excess monohydroxy-aldehyde remains after completion of the reaction, in addition to, or other than, removing such excess by steam distillation, it can be dissolved out of the final reaction mixture by a solvent for it that is inert to the final product, e.g. cyclohexane.

Whenever in the process of the invention, the reaction mixture may need to be filtered after completion of the condensation reaction, or before neutralizing the catalyst, and is too viscous to filter readily, it can be thinned sufficiently by mixing in a suitable quantity of an inert solvent for the condensation product.

The films obtained as part of the invention, as illustrated by those described in Example 12, are distinctively advantageous because of their unique stability against clouding or wetting merely from their own constituents. This is a sharp contrast to the polyvinyl alcohol films wherein glycerine alone is used as the plasticizer. While such a film is very flexible, the glycerine very readily migrates and the film surface becomes wet and clouded. Such migration of the glycerine and these accompanying disadvantages are avoided when it is replaced in whole or in part by a sufficient quantity of a suitable monohydroxy lower alkylidene saccharide of the invention, for example, that of Example 1. If only part of the glycerine is to be replaced, there should be used at least the minimum quantity of a monohydroxy lower alkylidene saccharide of the invention, such as that of Example 1, sufficient to eliminate the disadvantages experienced when glycerine is used alone. The minimum cannot be given specifically for it will vary with the product. It can readily be found by simple trial with the selected monohydroxy alkylidene saccharide.

Included also in the invention are other films plasticized by incorporating in them a sufficient quantity of one or more of the monohydroxy lower alkylidene saccharides of the invention along with, or in place of, the plasticizer heretofore used in such film, as seen in the following merely illustrative example:

*Example 17.—Plasticized casein film*

One part of the water-soluble alkylidene saccharide of Example 1 and one part of casein (treated to be water-soluble, e.g. The Borden Company, New York, N.Y., "PV-407" casein) are dissolved in four parts of water, and the resulting solution is coated over glass surfaces in the manner described in Example 12 and allowed to air dry. The result is an elegantly pliable casein film. Instead of equal parts of the alkylidene saccharide and casein, their ratio can be varied, for example, even to three parts of the former to seven parts of the water-soluble casein.

Instead of being cast into films, the just described water solutions of alkylidene saccharide and casein, in the same or other suitable concentrations can be incorporated into glue or ink compositions or in leather finishes or other coating compositions to improve their qualities on drying. They can be likewise incorporated in paper fiber suspensions (to be fed to the Fourdrinier). In lower concentrations, for example, from about one to about five percent total solids (i.e. of the alkylidene saccharide and the casein), they can be used for sizing textiles.

The aqueous solutions of one or more of the alkylidene saccharides of the invention and polyvinyl alcohol in similar proportions to one another can also be used in similar concentrations in the various foregoing uses mentioned for the solutions containing casein. When thus impregnated into textile fibers, increased abrasion resistance and usually also increased tensile strength is imparted to them, as shown by the following merely illustrative examples:

*Example 18*

(A) *Cotton (using 20-single cotton ends).*—(i) These cotton fibers were run through a five percent aqueous solution of the aldol cyclic acetal of isopropylidene sucrose of example 6, thus applied as a size. The excess solution was squeezed out and the thus sized cotton fibers were then dried in known manner. Tested by the needle eye abrasion resistance technic, they showed a seventy percent increase in abrasion resistance over that of the unsized cotton fibers.

(ii) These cotton fibers similarly sized with a five percent aqueous solution of the aldol cyclic acetal of the glycoside of Example 7, showed a twenty percent increase in tensile strength over the unsized fibers. By the rotating drum abrasion resistance technic, these sized fibers showed a two hundred percent increase in abrasion resistance.

(iii) The end concentrate of Example 9 was extracted with cyclohexane, and the portion not dissolved by it was then further concentrated. It was water-soluble. These cotton fibers similarly sized with a five percent aqueous solution of this concentrated water-soluble fraction showed, by the rotating drum technic, a one hundred and fourteen percent increase in abrasion resistance.

(B) *Nylon fibers.*—Nylon fibers similarly sized with a five percent aqueous solution of polyvinyl alcohol and the aldol cyclic acetal of the glycoside of Example 7 (one part of the alcohol to seven parts of the cyclic acetal) showed a thirty percent increase in tensile strength over the unsized fibers.

(C) *Filament rayon.*—Similarly sized with a five percent aqeous solution of the concentrated water-soluble fraction of the product of Example 9, used in (iii) above, rayon filament showed, by the rotating drum technic, a fifteen percent increase in abrasion resistance.

(D) *"Dacron" and "Orlon" fibers.*—Marked increase in abrasion resistance and tensile strength, as evidenced by excellent improvement in both weaving and knitting runs, results from similarly separately sizing "Dacron" and "Orlon" fibers with an aqueous solution containing together two and one-half percent of each, polyvinyl alcohol and the aldol cyclic acetal of isopropylidene sucrose of Example 6.

The sizing of any of the fibers mentioned in this example and others or combinations of any of them can be similarly sized with other concentrations of the same sizing agents or of any other suitable or compatible one or more of the monohydroxy-aldehyde derived cyclic acetals of the invention alone or together with other sizing agents.

Printing inks comprising a suitable one or more of the monohydroxy-aldehyde derived cyclic acetals of a saccharide of the invention are illustrated by, but not restricted to, the following examples:

*Example 19*

Printing ink compositions were prepared in known manner by grinding together the indicated parts by weight of the various ingredients in the two different Examples A and B:

|  | A | B |
|---|---|---|
| zein | 12.95 | 13.65 |
| aldol cyclic acetal of isopropylidene sucrose (example 6) | 12.95 | 13.65 |
| pigment (unresinated Calcium Lithol Red) | 18.00 | 9.10 |
| propylene glycol | 56.10 | 63.60 |

Using the Bird applicator, separate "drawdowns" were made of each of these two printing inks. Others were made also of black printing inks having the same quantities of zein and cyclic acetal respectively as in the A and B inks, sixteen and twenty parts respectively of furnace black as pigment, and the respectively corresponding quantities of propylene glycol to make one hundred parts. Still another somewhat similar printing ink was prepared with the aldol cyclic acetal of the glycoside of Example 7. These "drawdowns" rapidly heat dried at high temperature, to evaporate the propylene glycol, in known manner left especially satisfactory water-resistant films.

Other printing ink compositions can be prepared containing some other one or more of the monohydroxy aldehyde derived cyclic acetal of saccharides of the invention with zein or some replacement of it.

The hydroxy aldehyde derived cyclic acetals of the invention are compatible with rosin and also with shellac. It appears that any one or more of these cyclic acetals can be melted in any amount up to about an equal amount, into the rosin, and possibly even somewhat more, all depending on the specific derivative to be melted in, and yet give a homogeneous melt which after cooling leaves a still homogeneous solid product. For example, one part of the aldol cyclic acetal of isopropylidene sucrose of Example 6 melted together homogeneously with two parts of rosin and the composition, after the melt was cooled, was also homogeneous.

Similarly, likewise depending on the specific aliphatic monohydroxy aldehyde derived cyclic acetal used, there can be incorporated homogeneously into shellac any amount of one or more of such acetal up to about equal to, or possibly somewhat more than, the amount of shellac solids without adversely affecting the films applied with such compositions. Thus, for example, twenty-five parts of the aldol cyclic acetal of isopropylidene sucrose of Example 6 was incorporated in a shellac solution per seventy-five grams of shellac solids without embrittling the film obtained from the resulting composition.

The invention includes also the methods of preparing the various films, glues, printing inks, papers, leather finishes and other coatings, and the methods of sizing the various fibers with baths, containing any of the monohydroxy lower aldehyde derived cyclic acetals of saccharides of the invention, as well as the resulting films, glues, printing inks, papers, leather finishes and other coatings, and fibers and fabrics containing any of these hydroxyaldehyde derived cyclic acetals. Also part of the invention are the solutions from which the films are prepared as well as those used in sizing or otherwise treating the fibers or fabrics made from them, and also the rosin and shellac compositions containing any of these cyclic aldehydes.

While the several different aspects of the invention have been illustrated in relation to certain specific embodiments of them, it is understood that various modifications and substitutions can be made in any of them within the scope of the appended claims which are intended also to cover equivalents of the various specific embodiments.

What is claimed is:

1. A methanol soluble cyclic acetal of a lower aliphatic monohydroxy aldehyde, having from four to seven carbon atoms, and at least one saccharide member of the class consisting of (a) a monosaccharide, (b) a disaccharide, (c) a lower-alkyl glucoside, (d) an arylalkyl glucoside, (e) a lower alkylidene cyclic acetal of a monosaccharide, (f) a lower alkylidene cyclic acetal of a disaccharide, (g) an arylalkylidene cyclic acetal of a monosaccharide, (h) an arylalkylidene cyclic acetal of a disaccharide, (i) a lower alkylidene cyclic acetal of a lower-alkyl glucoside, (j) a lower alkylidene cyclic acetal of an arylalkyl glucoside, (k) an arylalkylidene cyclic acetal of an arylalkyl glucoside, and (l) an arylalkylidene cyclic acetal of an arylalkyl glucoside; and wherein the aryl group of the arylalkyl radical of the arylalkyl glucoside of each of the members (d), (j) and (l) is mononuclear and the alkyl group of that arylalkyl radical is lower alkyl; and the aryl group of the arylalkylidene radical in the arylalkylidene cyclic acetal of each of the members (g), (h), (k) and (l) is mononuclear and its alkylidene portion is lower alkylidene; and wherein the cyclic acetal groups result from reacting the lower aliphatic monohydroxy aldehyde with the saccharide in the proportions of roughly about two moles of said aldehyde for each monosaccharide unit of the saccharide.

2. A cyclic acetal as claimed in claim 1, wherein the aldehyde is aldol.

3. A cyclic acetal as claimed in claim 2, which is water-soluble.

4. A cyclic acetal as claimed in claim 1, wherein the lower aliphatic monohydroxy aldehyde is aldol and the saccharide is a disaccharide.

5. A cyclic acetal as claimed in claim 4, wherein the disaccharide is sucrose.

6. The method of preparing a cyclic acetal as covered by claim 1, which method comprises condensing together for a sufficient time for the desired cyclic acetal to be obtained, and in the presence of a sufficient quantity of an acid condensation catalyst adapted to promote condensation of an aldehyde carbonyl group with hydroxyl groups of a saccharide substance having at least two hydroxyl groups separated from one another by from two to three carbon atoms, (i) a lower aliphatic monohydroxy aldehyde having from four to seven carbon atoms, and (ii) at least one saccharide having at least two free hydroxyl groups separated from one another by from two to three carbon atoms and being a member of the class consisting of (a) a monosaccharide, (b) a disaccharide, (c) a lower-alkyl glucoside, (d) an arylalkyl glucoside, (e) a lower alkylidene cyclic acetal of a monosaccharide, (f) a lower alkylidene cyclic acetal of a disaccharide, (g) an arylalkylidene cyclic acetal of a monosaccharide, (h) an arylalkylidene cyclic acetal of a disaccharide, (i) a lower alkylidene cyclic acetal of a lower-alkyl glucoside, (j) a lower alkylidene cyclic acetal of an arylalkyl glucoside, (k) an arylalkylidene cyclic acetal of an arylalkyl glucoside, and (l) an arylalkylidene cyclic acetal of an arylalkyl glucoside; and wherein the aryl group of the arylalkyl radical of the arylalkyl glucoside of each of the members (d), (j) and (l) is mononuclear and the alkyl group of that arylalkyl radical is lower alkyl; and the aryl group of the arylalkylidene radical in the arylalkylidene cyclic acetal of each of the members (g), (h), (k) and (l) is mononuclear and its alkylidene portion is lower alkylidene; and in the proportions of roughly about two moles of said lower aliphatic monohydroxy aldehyde for each monosaccharide unit of the saccharide, and at a temperature from about ambient temperature up to one below that at which the aliphatic monohydroxy aldehyde dehydrates to an unsaturated compound; and separating the desired product.

7. The process as claimed in claim 6, wherein the aldehyde is aldol.

8. The process as claimed in claim 6, wherein the upper limit of temperature for condensing together the lower aliphatic monohydroxy aldehyde and the saccharide is about 100° C.

9. The process as claimed in claim 8, wherein the aldehyde is aldol and the saccharide is a disaccharide.

10. The process as claimed in claim 9, wherein the disaccharide is sucrose.

References Cited in the file of this patent

UNITED STATES PATENTS

| 1,902,866 | Kranzlein et al. | Mar. 28, 1933 |
| 1,949,832 | Ford | Mar. 6, 1934 |
| 1,974,064 | Ford | Sept. 18, 1934 |
| 2,110,499 | Carothers | Mar. 8, 1938 |
| 2,310,943 | Dorough et al. | Feb. 24, 1943 |
| 2,360,477 | Dahle | Oct. 17, 1944 |
| 2,387,662 | Holst | Oct. 23, 1945 |
| 2,666,713 | Lang et al. | Jan. 19, 1954 |
| 2,785,996 | Kress | Mar. 19, 1957 |

UNITED STATES PATENT OFFICE
CERTIFICATION OF CORRECTION

Patent No. 2,956,963                           October 18, 1960

Ronald J. Baird

It is hereby certified that error appears in the above numbered patent requiring correction and that the said Letters Patent should read as corrected below.

Column 11, lines 70 and 71, for "5-hydroxypentanol" read -- 5-hydroxypentanal --.

Signed and sealed this 18th day of July 1961.

(SEAL)
Attest:

ERNEST W. SWIDER
Attesting Officer

DAVID L. LADD
Commissioner of Patents